OR    3,700,302

United Sta[tes Patent]
Mohon et al.

[15] 3,700,302
[45] Oct. 24, 1972

[54] VACUUM FILM HOLDER FOR HOLOGRAMS

[72] Inventors: Windell N. Mohon, Winter Park; Alfred H. Rodemann, Maitland, both of Fla.

[73] Assignee: The United States of America as represented by the Secretary of the Navy

[22] Filed: May 27, 1971

[21] Appl. No.: 147,558

[52] U.S. Cl..........................................350/3.5, 355/73
[51] Int. Cl................................................G03b 27/60
[58] Field of Search........350/3.5; 95/66; 355/2, 104, 355/73, 76, 91; 35/1

[56] References Cited

UNITED STATES PATENTS 1,945,481   1/1934   Dilkes..........................355/73

OTHER PUBLICATIONS

Jeong, 57 J. Opt. Soc' y AM, 1396– 1398 (11/1967).
Supertzi et al., 56 J. Opt. Soc' y AM, 524– 525, (4/1966).

*Primary Examiner*—David Schonberg
*Assistant Examiner*—Robert L. Sherman
*Attorney*—Richard S. Sciascia, John W. Pease and John F. Miller

[57] ABSTRACT

A movement proof film holder for making holograms is made by forming a vacuum chamber between the walls of two darkened open-ended concentric cylinders. The perforated walls of the inner cylinder are sealed by a layer of photographic film covering its inner surface. A vacuum is generated in the chamber to hold the film securely. A pair of similar cylinders made of transparent materials is used to hold the hologram for read-out.

1 Claim, 4 Drawing Figures

INVENTORS
WINDELL N. MOHON
ALFRED H. RODEMANN

VACUUM FILM HOLDER FOR HOLOGRAMS

BACKGROUND OF THE INVENTION

The invention is in the field of holograms. In the prior art great difficulty has been experienced in making satisfactory holograms because of minute movement of the photographic film used in the hologram making process. The ordinary film holding techniques used in photography are unsatisfactory because any small film movement during processing will ruin a hologram. "Small movement" as used here refers to any film movement greater than about one ten millionth meter during the exposure. Many expedients have been tried to avoid film movement. For example, circular springs to hold a film against a cylindrical shell have been tried. Efforts have been made to tape a film to a cylindrical shell. These expedients have proved unsatisfactory because regardless of how tightly the film is taped, or bound, some small movement will occur. The springs and tape used blocked a portion of the film, limiting the usable film area. They were cumbersome, difficult to handle, and often scratched or marred the film, impairing or destroying its recording capability.

Applicants have overcome the problems of the prior art with a novel movement-proof film holder which will not damage the film and which can be operated quickly and conveniently.

SUMMARY OF THE INVENTION

Two blackened open-ended concentric cylinders are fitted one inside the other with a space between them forming a vacuum chamber. The chamber is sealed at each end of the cylinders with O-rings or equivalent means. A vacuum source is connected to a fitting in the outer cylinder which communicates with the chamber. The inner cylinder is perforated with small passages leading from the interior of the cylinder to the chamber. A photographic film is positioned to cover all the passages and is held rigidly by a vacuum applied through the passages. The film is held so immovably that accurate high quality holograms can be made in the film without the detrimental effects experienced with prior art film holding devices.

DESCRIPTION OF THE PREFERRED EMBODIMENT

Figure 1:
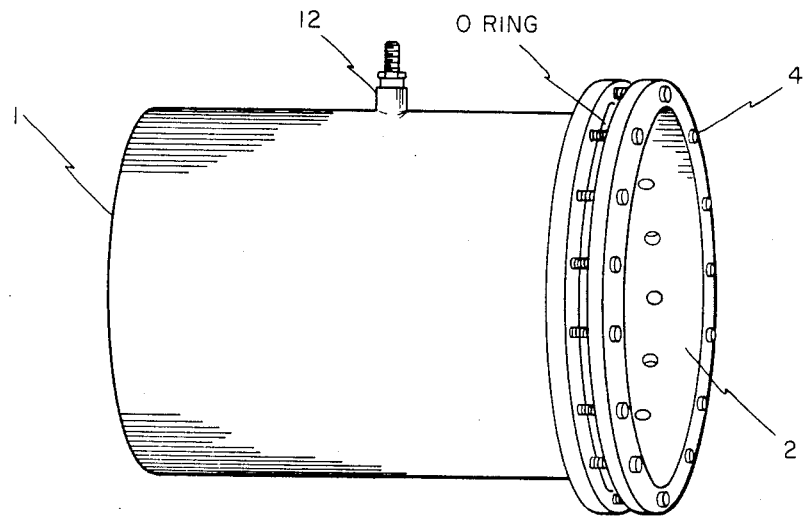
FIG. 1 is an exterior view of the invention.
Figure 2:
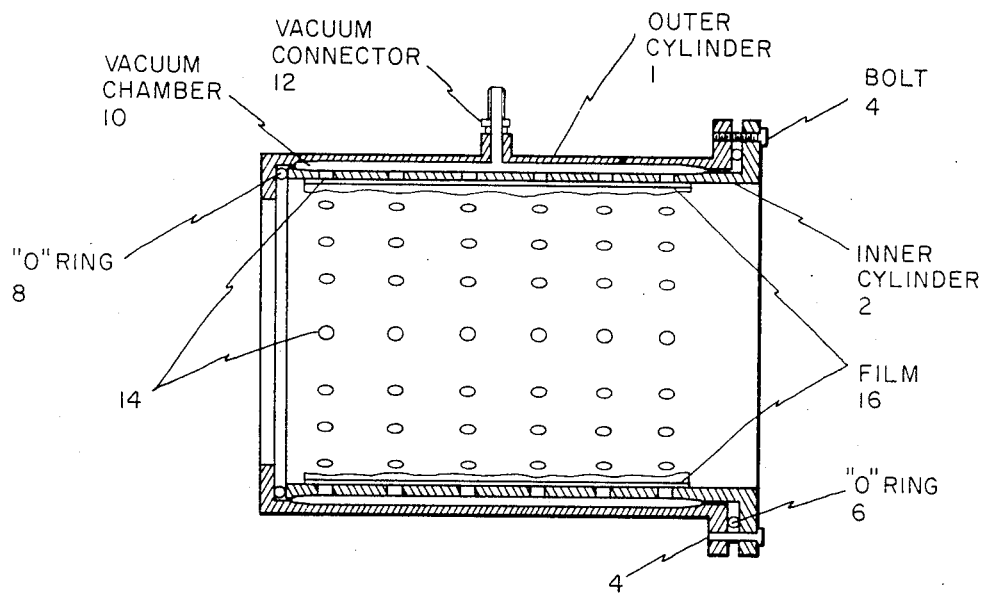
FIG. 2 is a sectional view of the invention.

The invention is shown in FIGS. 1 and 2, as comprising two concentric cylinders, an outer cylinder 1 and an inner cylinder 2. Both cylinders are open at each end and have an outside flange at one end. Outer cylinder 1 has an inside flange at the opposite end. Inner cylinder 2 is bolted inside outer cylinder 1 by a plurality of bolts 4 through the outer flanges. The bolts can be easily removed, thereby permitting a complete disassembly for inspection, cleaning, etc. An O-ring 6 between the outer flanges of 1 and 2 and an O-ring 8 between the inner flange of 1 and one end of 2 are compressed by the tightening of bolts 4 to seal a vacuum chamber 10 between the inner wall of 1 and the outer wall of 2. The vacuum chamber may be formed by wide annular grooves in the inner surface of 1 and the outer surface of 2 or if desired may be formed by a difference between the inner diameter of 1 and the outer diameter of 2 only. A vacuum connection 12 in the outer surface of 1 connects with the vacuum chamber 10. Connection 12 is connected to a vacuum line and pump means not shown to establish a vacuum in chamber 10. A plurality of small diameter holes or passages are made in the walls of inner cylinder 2 which communicate with the interior of cylinder 2 and vacuum chamber 10.

When the apparatus is used, a photographic film 16 is placed inside cylinder 2 in such position that the film blocks all of holes 14. A vacuum is then developed in chamber 10 by means not shown. The vacuum holds film 16 firmly and immovably against the inner wall of cylinder 2. Holes 14 are large enough and numerous enough to enable the vacuum applied therethrough to hold film 16 immovably but are so small that film 16 does not dimple at the holes. The exact size of holes 14 is a design choice related to the thickness and stiffness of the particular film used. The two cylinders are flat black to suppress light reflections which would adversely affect a hologram.

Figure 3:
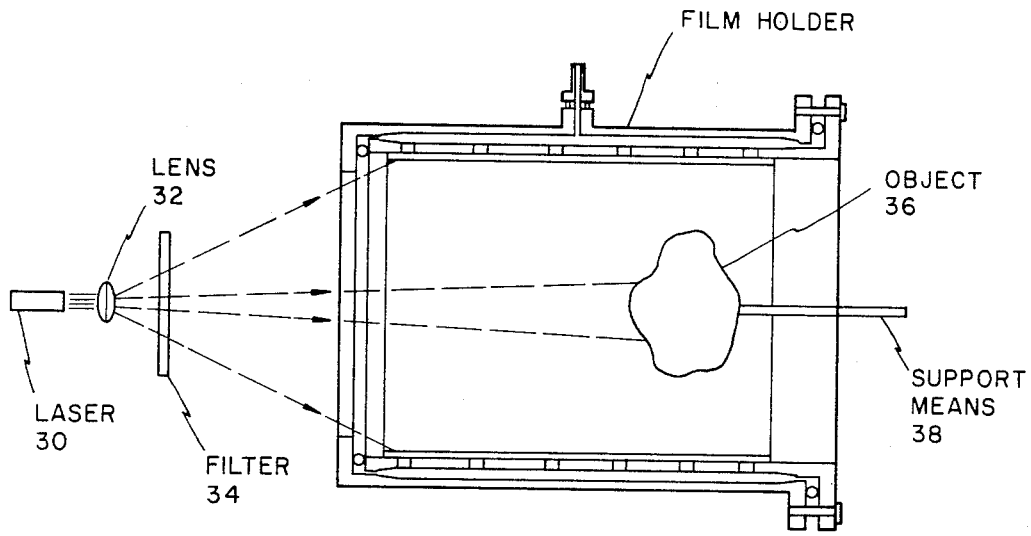
FIG. 3 illustrates a method of using the invention.

When film 16 is fixedly positioned in cylinder 2 a hologram is made on the film in the manner shown in FIG. 3. A laser light source 30 supplies a single laser beam through a lens 32 and a one micron filter 34 to illuminate film 16 and an object 36 which is the subject of the hologram being made. The laser light which strikes film 16 directly comprises the required holographic reference beam. The laser light scattered by object 36 is the holographic object beam. When film 16 has been properly exposed the vacuum source connected to the film holder is disconnected, releasing the film which is now developed and fixed and becomes a hologram of object 36. Since the film holder and optical system can be rigidly positioned and the film holder prevents the slight film movement which occurred with prior art film holding devices, a clear and accurate hologram results.

It should be understood that the described film stability is of the utmost importance. It has been found that film movement of more than about $10^{-7}$ meter during the exposure can destroy the holographic image.

Figure 4:
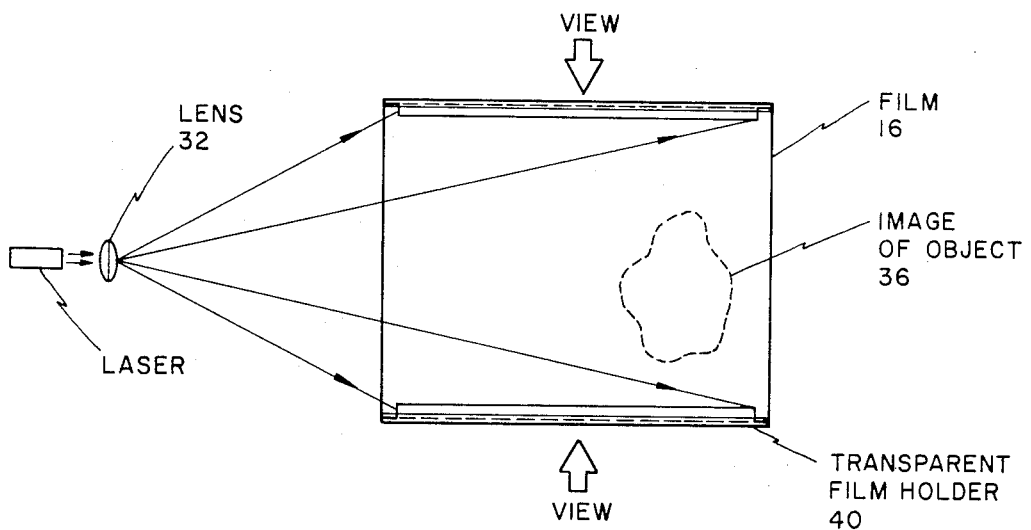
FIG. 4 shows apparatus for reading out a hologram made with the invention.

FIG. 4 shows means for reading out the holographic image in film 16. The film may be placed in a film holder similar to that shown in FIGS. 1 and 2, except that it is made of clear transparent material such as clear plastic or glass. Laser 30 and lens 32 are positioned relative to the film 16 in the same way as they are positioned relative to the film in FIG. 3. This is necessary so that the light impinges on the hologram at the correct angle, i.e. the same as used in making the hologram. In some applications a single transparent cylinder may be used for read-out.

The viewer may now view the three dimensional image of object 36 from any position around the transparent film holder. The viewer may move around the holder or he may rotate the holder to rotate the image. Alternatively, the film can be flattened on a transparent support such as a sheet of plastic or glass and illuminated by an undiverged laser beam in a manner known in the art to obtain a real image. The real image can be displayed on a screen.

What is claimed is:

1. In a film holder for making holograms, a pair of open-ended concentric cylinders having a vacuum chamber formed between the walls thereof, means providing a plurality of passages through the walls of the inner one of said concentric cylinders, said passages being of a size commensurate with the thickness and stiffness of the film used and being arranged in a regular pattern, whereby a sheet of film inside said inner cylinder in a covering relationship to said passages is held immovably when a vacuum is formed in said chamber, said pair of concentric cylinders comprising an outer cylinder and an inner cylinder, said outer cylinder having an exterior fitting forming a vacuum passage from said vacuum chamber to the exterior of said outer cylinder and adapted to be connected to a vacuum source for developing a vacuum in said chamber, sealing means at each end of said cylinders for forming said vacuum chamber, an outer flange formed on one end of said outer cylinder, an inner flange formed on the opposite end of said outer cylinder, an outer flange on one end of said inner cylinder, a plurality of bolts for bolting said outer flanges together with sealing means compressed therebetween and with sealing means compressed between said inner flange and the unflanged end of said inner cylinder to seal said vacuum chamber and to accurately align said inner cylinder within said outer cylinder so that said vacuum chamber is of uniform dimensions to apply a uniform vacuum to each of said plurality of passages to thereby enable the ready removal of said inner cylinder from said outer cylinder to facilitate inspection and cleaning and to insure the application of a uniform vacuum to all areas of said film, said cylinders being of a non-reflective black finish to minimize reflections during the making of holograms, and including a transparent cylinder having interior dimensions similar to said inner cylinder for holding holograms for read-out.

* * * * *